May 26, 1959 J. U. TORRES ET AL 2,888,278
COUPLING WITH AUTOMATICALLY ACTUATED CAM SLEEVE
Filed June 18, 1956 4 Sheets-Sheet 2
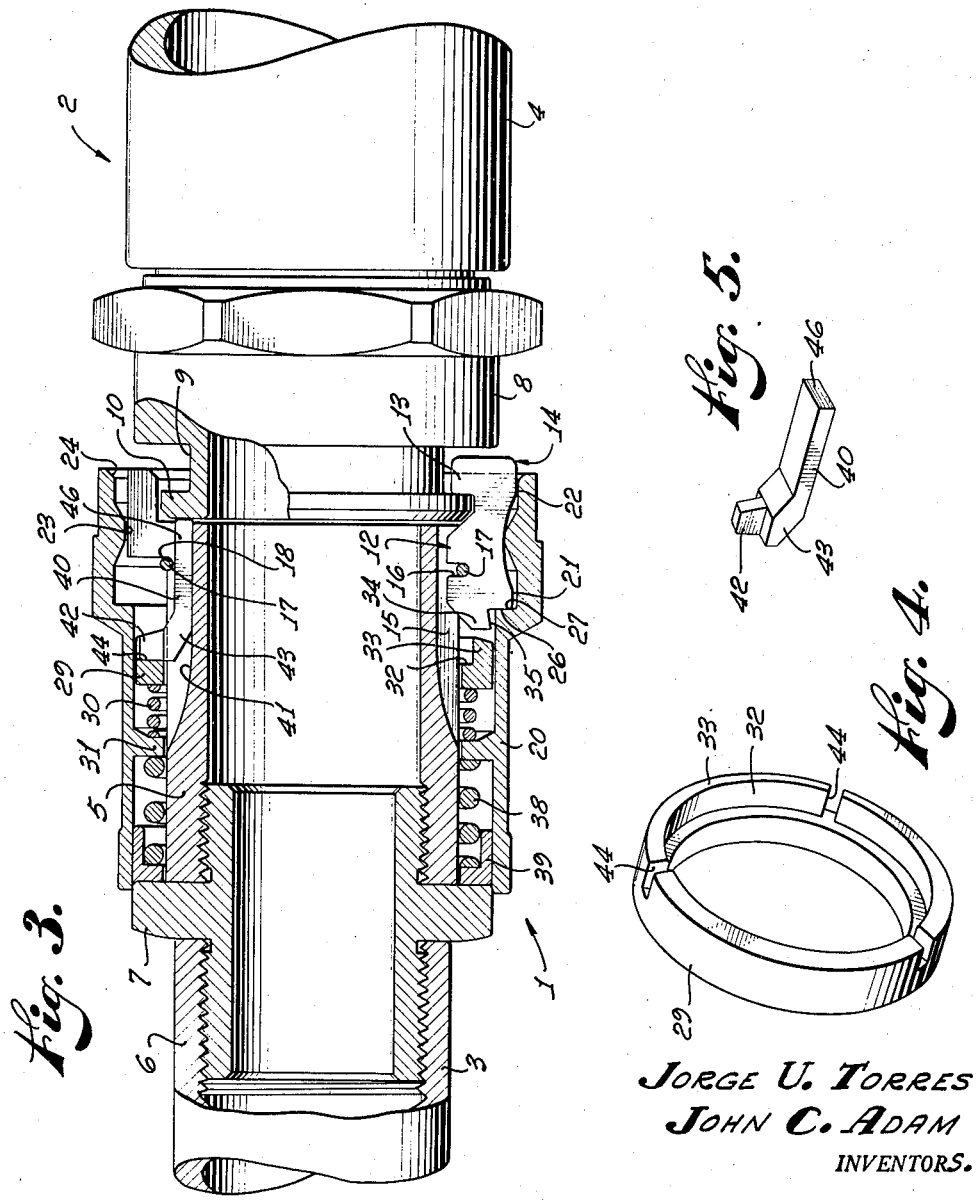
JORGE U. TORRES
JOHN C. ADAM
INVENTORS.
BY Paul A. Weilcin
ATTORNEY.

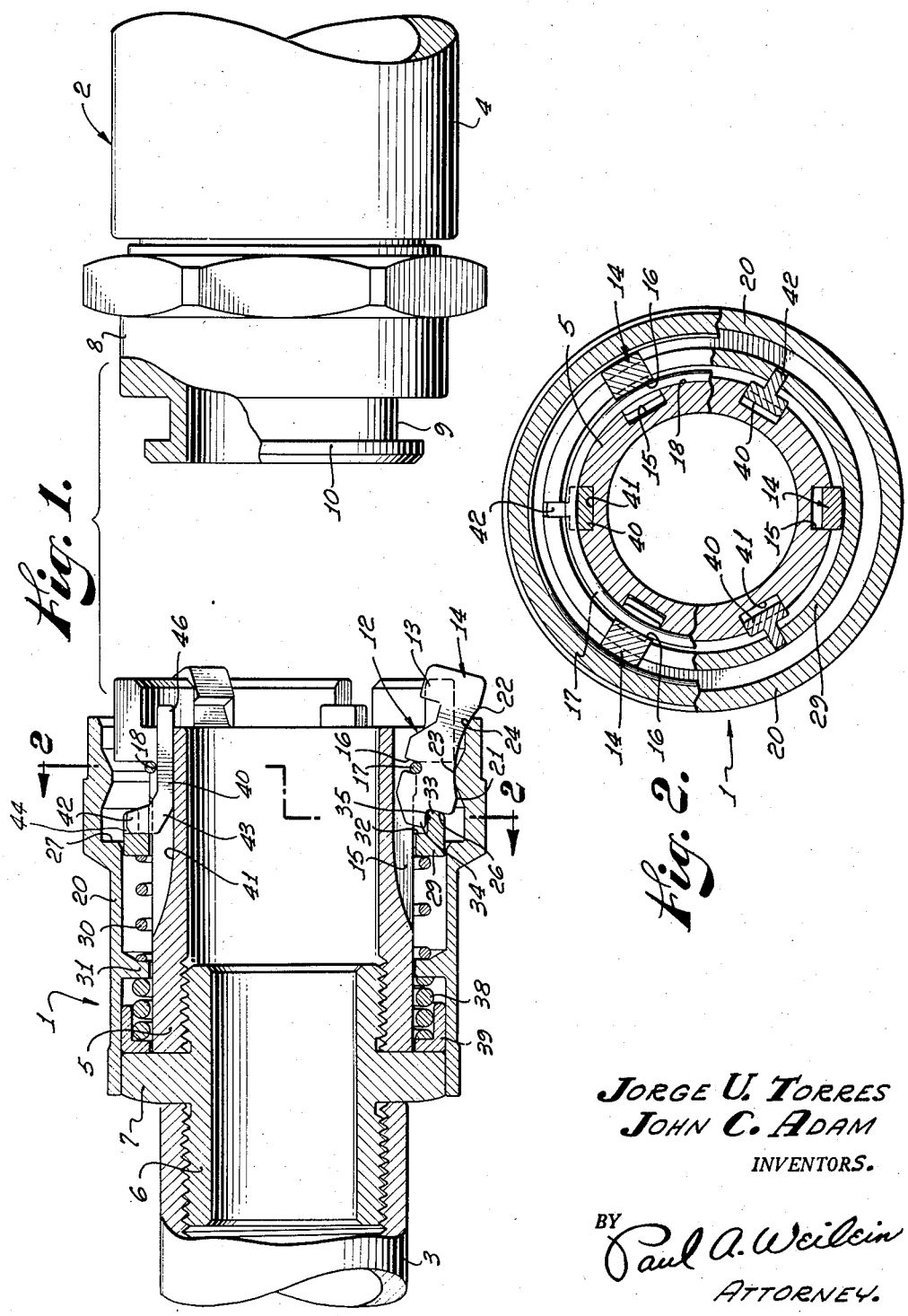

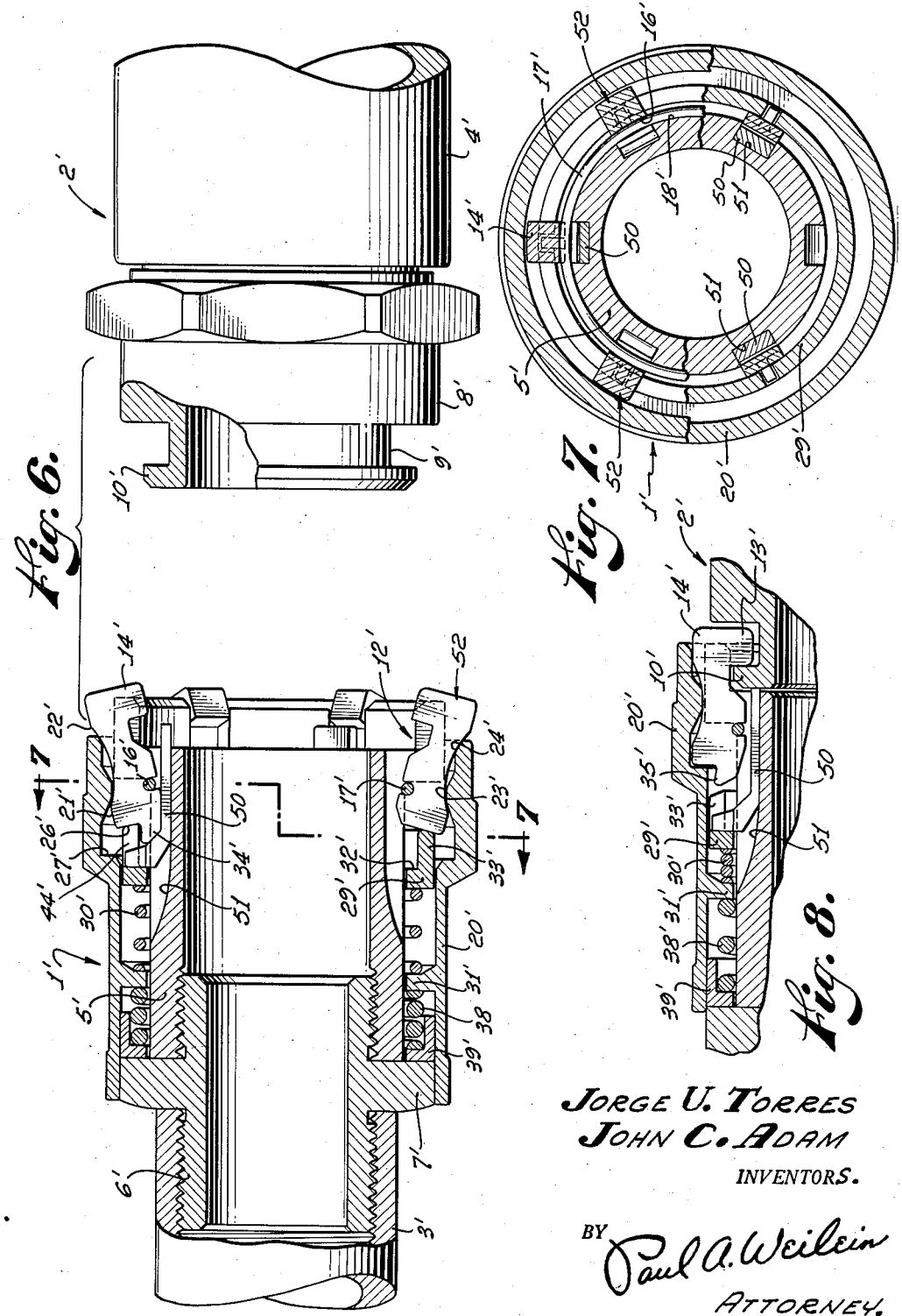

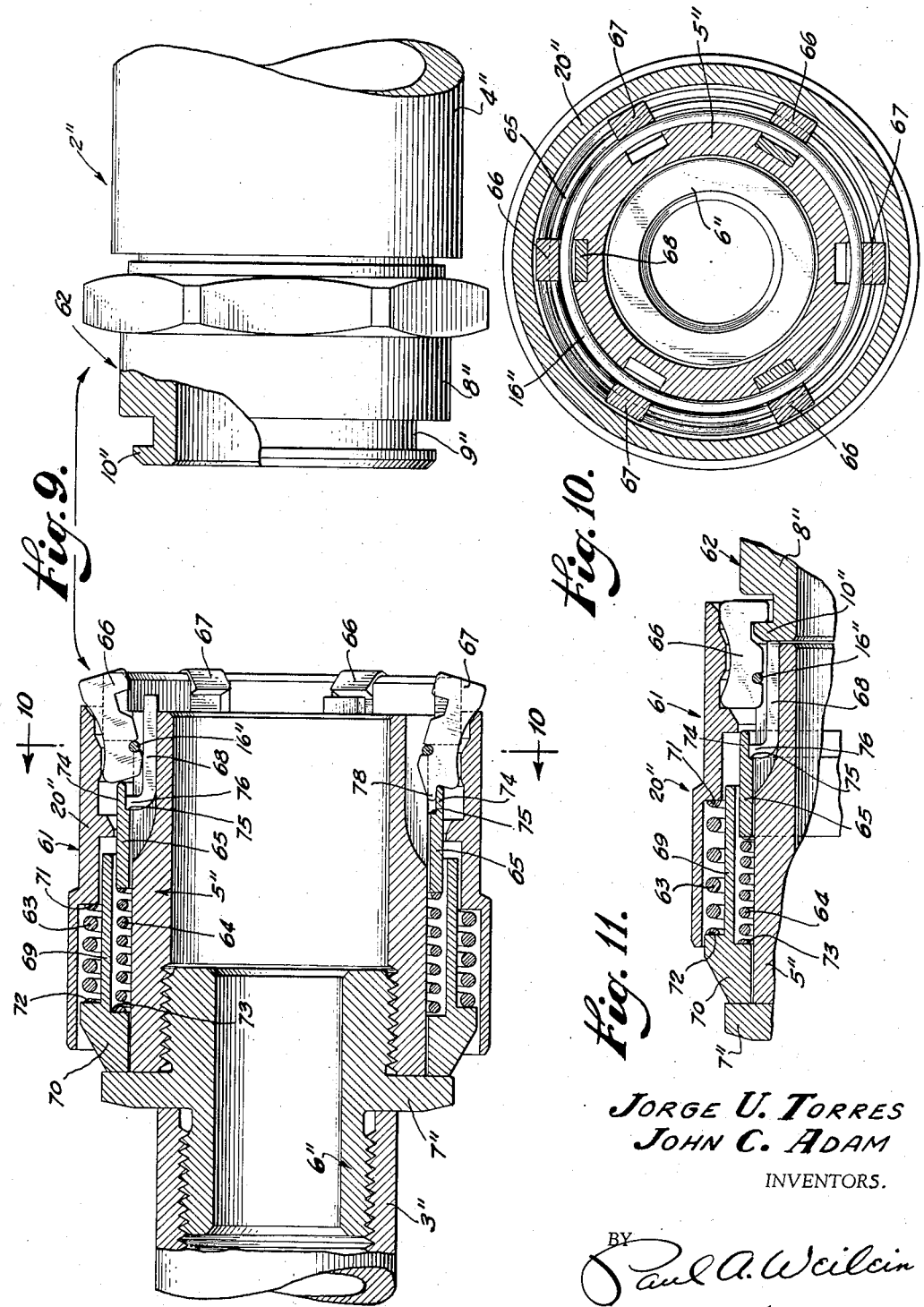
May 26, 1959  J. U. TORRES ET AL  2,888,278
COUPLING WITH AUTOMATICALLY ACTUATED CAM SLEEVE
Filed June 18, 1956  4 Sheets-Sheet 4
JORGE U. TORRES
JOHN C. ADAM
INVENTORS.
BY
Paul A. Weilein
ATTORNEY.

United States Patent Office

2,888,278
Patented May 26, 1959

2,888,278

COUPLING WITH AUTOMATICALLY ACTUATED CAM SLEEVE

Jorge U. Torres, Los Angeles, and John C. Adam, West Los Angeles, Calif., assignors to E. B. Wiggins Oil Tool Company, Inc., Los Angeles, Calif., a corporation of California Application June 18, 1956, Serial No. 592,019

17 Claims. (Cl. 285—313)

This invention relates to conduit couplings of the type wherein a pair of mutually engageable coupling members are provided with locking means for releasably locking the coupling members in coupled relation.

It is an object of this invention to provide an improved coupling of the character described wherein the coupling members may be quickly and reliably coupled and locked in coupled relation by simply moving them into engagement with one another.

It is another object of this invention to provide a coupling such as described wherein the coupling members may be quickly and reliably locked in coupled relation without requiring that any part of either coupling member be held in a particular manner or manipulated in any way other than as required to simply bring the coupling members into aligned engagement with one another.

It is another object of this invention to provide a coupling such as described in which novel locking means, when manipulated to an unlocking position, will be latched in such position subject to release and movement to lock the coupling members together responsive to movement of the coupling members into engagement with one another.

It is an additional object of this invention to provide a coupling such as described in which the movement of the locking means into position to releasably lock the coupling members, takes place responsive to moving said coupling members into engagement with one another.

Another object of this invention is the provision of a coupling such as described in which the movement of the locking means for locking the coupling members in coupled relation as well as the movement of the locking means for releasing the locking means, corresponds to the movement of the coupling members as required to couple and uncouple them.

A further object hereof is the provision of a coupling member in which manipulation of the locking means to release the coupling members, causes the locking means to be cocked so that upon recoupling of such members, the locking means automatically locks the coupling members in coupled relation.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view partly in elevation of a coupling embodying the present invention, showing the two coupling members thereof separated;

Fig. 2 is a sectional view taken on the line 2—2 of Fig. 1;

Fig. 3 is a longitudinal sectional view partly in elevation of the coupling, showing the two coupling members locked in coupled relation;

Fig. 4 is a perspective view of a latching member forming a part of the coupling of this invention;

Fig. 5 is a perspective view of one of the latch releasing members;

Fig. 6 is a longitudinal sectional view partly in elevation of a modified form of coupling embodying this invention, showing the coupling members separated;

Fig. 7 is a sectional view taken on the line 7—7 of Fig. 6;

Fig. 8 is a fragmentary longitudinal sectional view of the coupling shown in Fig. 7, showing how the two coupling members are locked in coupled relation;

Fig. 9 is a longitudinal sectional view partly in elevation of another modified form of this invention, showing the two coupling members thereof separated;

Fig. 10 is a sectional view taken on the line 10—10 of Fig. 9; and

Fig. 11 is a fragmentary longitudinal sectional view of the coupling shown in Fig. 10, illustrating how the coupling members are locked in coupled relation.

A preferred form of coupling embodying the present invention comprises mutually engageable coupling members 1 and 2 which, as shown in Figs. 1 and 3, are employed for example, to couple conduits 3 and 4.

The coupling member 1 includes a tubular body 5 having a flanged fitting 6 threaded into one end thereof for effecting a connection with the conduit 3. The flange 7 of the fitting 6 is interposed between the conduit and the adjacent end of the body 5 and extends radially outwardly from this body.

The coupling member 2 includes a tubular body 8 having one end adapted to be connected with the conduit 4. At the other end of the coupling member 2 is an external annular groove 9 which defines an annular flange 10. This flange constitutes a locking element for cooperation with locking means generally designated 12, operable on the coupling member 1 in a manner hereinafter described.

In couplings of the type to which this invention relates, it is desired that the coupling members be coupled and locked in coupled relation quickly with a minimum of manipulation. It is preferred that such coupling members will be coupled and locked in coupled relation without requiring that any part of either coupling member or the conduits connected thereto, be manually held or manipulated other than to serve as a hand hold for the sole purpose of moving the coupling members into engagement with one another. Thus, no movement of any part other than in the direction required for moving the coupling members, together, would be necessary to effect the locking of the coupling members in coupled relation.

The locking means 12 embodied in the present coupling provides the desirable features hereinbefore noted. It operates to lock the coupling members together incident to engagement of the coupling member with one another. Moreover, this locking means when moved to an unlocking position becomes latched or cocked in such position, subject, however, to being released and locking the coupling members together responsive to subsequent engagement of the coupling member with one another.

Accordingly, the locking means 12 readily may be manually pre-operated so that it is cocked in unlocked position before the coupling of the two coupling members is effected, whereby it will then lock the coupling members as desired incident to the coupling thereof. Also, when the coupling members are uncoupled, the locking means becomes cocked, whereby upon recoupling of the coupling members, the locking means will lock them together in the desired manner.

The locking means 12, as shown in Fig. 1–5, includes a plurality of locking members in the form of dogs 14 mounted in a circular series on the body 5 of the coupling member 1 for movement into and from a position to engage the locking element 10 on the coupling member 2. Each dog 14 has a hook portion 13 on its outer end to hook over the locking element 10. Fig. 1 shows the locking dogs latched in unlocking position, whereas Fig. 3 shows these dogs in locking position.

The locking dogs 14 are mounted in recesses 15 in the exterior of the body 5 of the coupling member. Each dog on its lower surface between its ends is provided with a notch 16 for reception of a split ring 17. The ring 17 serves as a pivot for the dogs 14 and is seated in an annular groove 18 in the exterior surface of the body 5. The groove 18 intersects the recesses 15, and the ring 17 also holds the dogs against axial displacement.

As a means for holding the dogs 14 against radial displacement as well as for moving the dogs into and out of locking position, an actuating sleeve 20 is mounted on the body 5 of the coupling member so that the sleeve and body are relatively movable axially thereof. The sleeve 20 surrounds the dogs 14 so as to hold them against radial displacement.

The dogs 14 and the sleeve are provided with means cooperable to move the dogs into and out of locking position responsive to relative movement between the sleeve and body 5 axially of the body. As here shown, the dogs are provided on their upper sides and adjacent opposite ends with protuberant cam portions 21 and 22 adapted to be engaged by an annular cam portion 23 and an end portion 24 of the sleeve 20, respectively. The annular cam portion 23 on the sleeve engages the cam portions 21 on the rear ends of the dogs 14, as shown in Fig. 1, to rock the dogs out of locking position responsive to rearward sliding movement of the sleeve 20 relative to the body 5 of the coupling member or forward movement of this body relative to the sleeve.

When the sleeve is moved forwardly, the annular cam portion 23 on the sleeve rides forwardly on the dogs past the pivot points of the dogs 14, as the end portion 24 of the sleeve 20 also moves forwardly on the dogs, thereby moving the dogs into locking position. The end portion 24 overlies and contacts the portions 22 on the outer ends of the dogs to hold the dogs in locking position, as shown at the lower side of Fig. 3. At this time the annular cam portion 23 rests on the mid portions of the dogs. Also in this position, shoulders 26 at the rear ends of dogs abut an annular shoulder 27 on the interior of the sleeve, as shown in Fig. 3.

Latching means hereinafter described, is operable to releasably hold the dogs 14 in the unlocking position as shown at the lower side of the coupling member 1 in Fig. 1. In this connection it should be noted that the dogs 14 and the sleeve 20 constitute means for restraining relative axial movement between the body 5 and sleeve 20 when the dogs are latched in this unlocking position. The dogs then abut the outer end of the sleeve. With the sleeve 20 and dogs 14 thus held in cocked or set position, the coupling member 1 is subject to being coupled and locked to the coupling member 2 with one simple motion thereof, in accordance with the invention.

The latching means includes a latch ring 29 surrounding the body 5 and axially movable thereon between positions for latching and releasing the dogs 14. A coiled spring 30 surrounding the body 1 and confined between the ring 29 and an internal annular flange 31 on the sleeve 20, urges the ring 29 into latching position. The ring 29 has an annular counterbore 32 forming a flange 33. Each of the dogs has a reduced rear end 34 adapted to extend into the counterbore 32 in the latch ring 29. The reduced end 34 forms a shoulder 35, also the shoulder 26. With this arrangement, when the dogs 14 are rocked into unlocking position, the reduced ends 34 of the dogs are moved from alignment with the flange 33 on the latch ring 29 (see Fig. 3) into alignment with the counterbore 32 (see Fig. 1) whereupon the spring 30 moves the ring 29 forwardly so that the dogs are latched by the ring in unlocking position. When the dogs 14 are thus latched, the shoulders 35 thereon abut the inner surface of the flange 33 whereby the shoulders 26 on the dogs abut the outer edge of the flange 33 on the latch ring, thereby securely but releasably holding the dogs in unlocking position. The outer ends of the dogs 14 then engage the end portions 24 of the sleeve as shown in Fig. 1, to prevent relative axial movement between the body 5 and the sleeve 20.

Means are provided on the coupling member 1 for urging relative axial movement between the sleeve 20 and the body of the coupling member 1, for effecting movement of the dogs 14 into locking position incident to release of the dogs by the latch ring 29. Moreover, means are also provided on the coupling member 1 for moving the latch ring 29 to release the dogs 14 responsive to the coupling members 1 and 2 being engaged with one another.

The means for so biasing relative axial movement of the sleeve 20 and body 5, in this instance includes, a coiled spring 38 of greater force than the spring 30. The spring 38 surrounds the body 5 and is confined between the annular flange 31 of the sleeve and a ring 39 surrounding the body and abutting the flange 7 on the fitting 6.

When the coupling members are separated and the dogs 14 and sleeve 20 are not held or cocked in unlocking position by the latch ring 29, the stronger spring 38 urges the sleeve 20 forwardly so that the sleeve and dogs will occupy substantially the same position they attain when the coupling members are locked together, as shown in Fig. 3. However, the locking ring will be forced outwardly by the spring 30, which latter is then compressed a lesser extent than shown in Fig. 3, so that the outer edge of the flange 33 on the ring will abut the reduced ends of the dogs.

The coupling member 1 is prepared for the coupling thereof with the coupling member 2, by effecting relative movement of the sleeve 20 and the body 5 such that the annular cam portion 23 on the sleeve encounters the cam portions 21 on the dogs 14 to rock the dogs into unlocking position. When the dogs 14 move into unlocking position the latching ring 29 is moved forwardly by the spring 30 into position to latch the dogs in unlocking position as hereinbefore described.

The latch-releasing means provided on the coupling member 1 is operated by engagement with the coupling member 2. This releasing means operates to move the latch ring 29 out of engagement with the dogs 24 and as here shown, includes a plurality of latch releasing rods 40 slidable in radially disposed recesses 41 formed on the exterior of the body 5. The recesses 41 are disposed between the dogs 14, as shown in Fig. 3. The releasing rods 40 are operatively connected with the latch ring 29 by means of lugs 42 on the offset inner ends 43 of the rods. These lugs engage in notches 44 in the flange 33 of the ring 29 so that when the rods 40 are pushed inwardly by contact with the coupling member 2, the latch ring 29 will be moved rearwardly out of latching position and release the dogs 14. Accordingly, the outer ends 46 of the release rods 40, when the dogs 14 are latched by the ring 29, are extended outwardly (see Fig. 1) beyond the adjacent end of the body 5, so as to be engaged by the flange 10 on the body 8 of the coupling member 2 when moving the two coupling members together.

It should be noted that rearward sliding movement of the sleeve 20 relative to the body 5 of the coupling member 1, or forward sliding movement of this body relative to the sleeve, will cause the annular cam portion 23 on the sleeve to engage the cam portions 21 on the dogs 14 and rock the dogs into unlocking position.

Coincident with the dogs 14 being moved into this position, the latch ring 29 is moved forwardly by the spring 30 so that the portion 33 of the ring will encompass the reduced ends 34 of the dogs and hold the dogs in unlocked position. The sleeve 20 is also held at this time by the dogs 14 to prevent relative axial movement between the sleeve and the body 5. The releasing rods 40 are now extended as shown in Fig. 1, and the coupling member is cocked and ready to be coupled to the coupling member 2. The cocked condition of the coupling member 1 is effected before the coupling members are originally coupled and is also effected incident to unlocking the dogs 14 to uncouple the coupling members.

By having the coupling member 1 cocked as shown in Fig. 1 before it is engaged with the coupling member 2, but a simple movement of these coupling members is all that is required to couple them. The coupling member 1 may be held at any place along its length or by the conduit 3 connected thereto in being moved to engage the coupling member 2. In moving the coupling members together, the release rods 40 will engage the coupling member 2 and move the latch ring 29 so that the dogs 14 are released. When these dogs are released, the spring 38 causes the sleeve to be moved forwardly, to rock the dogs into locking engagement with the element 12 on the coupling member 1.

A modified form of this invention, as shown in Figs. 6-8 differs from the form shown in Figs. 1-5, primarily as to the location, thickness and length of the latch releasing rods 50 slidable in the recesses 51, also in the use of six locking dogs wherein three of the dogs designated 52 are of different form. The other three dogs are of substantially the same form as the dogs 14 shown in Figs. 1-5.

As the parts in this modified form, excepting the rods 50, recesses 51 and dogs 52, are of substantially the same construction as corresponding parts shown in Figs. 1-5, they are identified by the same reference numerals to which is added the prime character.

The dogs 14' and 52 are arranged so that each of the dogs 52 is between a pair of the dogs 14'. The structural difference between these dogs is that the dogs 52 have no reduced rear ends 34' as provided on the dogs 14', which latter are latched by the latching ring 29' in the same manner as the dogs 14 shown in Figs. 1-5.

The rods 50 are mounted in the same recesses 51 as the three dogs 14' and are operable to move the latching ring 29' to release the dogs 14' in the same manner as the rods 40 in Figs. 1 and 5. The rods 50 are somewhat longer than the rods 40 as they are extended rearwardly of the ends 34' of the dogs 14'.

In all respects this modified coupling operates in the same manner as the coupling shown in Figs. 1-5.

It should be noted that the number of dogs and latch releasing rods may be varied in the coupling shown in Figs. 6-8 as well as in the coupling shown in Figs. 1-5, it being preferred to employ at least three locking dogs subject to being latched and at least three latch releasing rods in each coupling embodying the present invention.

Another modified form of the invention (Figs. 9-11) comprises a pair of coupling members 61 and 62 of substantially the same construction as the coupling members 1' and 2' shown in Figs. 6, 7 and 8, except as to the arrangement of the springs 63 and 64 in the coupling member 61, the width of the latch ring 65 and the arrangement of the two sets of locking dogs 66 and 67 with relation to the latch releasing rods 68.

Other parts of this form which are of the same construction as corresponding parts shown in Figs. 6, 7 and 8 are identified in Figs. 9, 10 and 11 by the same reference numbers accompanied by the double prime character.

The springs 63 and 64 in this modified form of the invention, are arranged to work independently, only one spring being compressed in the operation of latching the dogs 66 and 67 and the sleeve 20 in cocked position. Accordingly, the spring 63 for urging the sleeve 20 in the direction for rocking the dogs into locking position, is concentric with and surrounds the spring 64 for urging the latch ring 65 into latching position, being separated therefrom by a spacer sleeve 69 surrounding the body 5" of the coupling member 61. The sleeve 69 has an enlarged end 70 which abuts the flange 7" on the fitting 6". This enlarged end is engaged with the inner surface of the sleeve 20" and the outer surface of the body 5", respectively, so as to circumferentially space the sleeve 69 proper from the actuating sleeve 20" and the body 5". The spring 63 surrounds the sleeve 69 with its ends abutting a shoulder 71 on the sleeve 20" and a shoulder 72 on the end 70 of the sleeve 69. The spring 64 is confined between the body 5" and the sleeve 69 with its ends engaged with the inner end of the latch ring 65 and a shoulder 73 on the end 70 of the sleeve 69.

The latch ring 65 surrounds the body 5" and has a recessed outer end defining an annular flange 74 and a shoulder 75. As here shown, there are three of the latch releasing rods 68 axially slidably mounted on the body 5" with their right angularly disposed inner ends 76 positioned to extend under the flange 74 and against the shoulder 75. The spring 64 extends the ring 65 and rods 68 forwardly as shown in Fig. 9, so that the outer ends of the rods project outwardly from the outer end of the body 5" when the latch ring 65 latches the dogs 66 and 67 in unlocking position.

As here shown, there are three of the locking dogs 66 and three of the locking dogs 67. The dogs 66 correspond to the dogs 52 as shown in Figs. 6, 7 and 8, whereas the dogs 67 correspond to the dogs 14' shown in Figs. 6, 7 and 8. The dogs 67 are provided with reduced inner ends 78 adapted to extend under the flange 74 on the latch ring 65 when the latter is in latching position as shown in Fig. 9.

The latch releasing rods are mounted under the dogs 66 although they could be mounted under the dogs 67 in the manner shown in Figs. 7, 8 and 9, if desired.

When the sleeve 20" is retracted against the action of the spring 63 only, the sleeve and dogs cooperate in the same manner as shown in Fig. 6, to rock the dogs into unlocking position. This disposes the inner ends 78 of the dogs 67 in a position such that the spring 64 will urge the latch ring 65 forwardly to cause the flange 74 thereon to ride over the ends 78 of the dogs 67, thereby locking these dogs in unlocking position. The dogs 67 which thus held, engage the outer end of the sleeve 20" as shown in Fig. 9, thereby holding the sleeve 20" in retracted position.

When the coupling members 61 and 62, arranged as shown in Fig. 9, are moved into engagement with one another, latch releasing rods 68 will abut the coupling member 62 and be pushed inwardly, thereby moving the latch ring 65 free of the dogs 67 and releasing the dogs. Upon this release of the dogs, the spring 63 urges the sleeve 20" forwardly, thereby rocking the dogs into locking engagement with the flange 10" on the coupling member 62.

We claim:

1. A coupling comprising: a pair of mutually engageable coupling members; locking means movable on one of said coupling members; a locking element on the other of said coupling members; a sleeve on said one coupling member; said sleeve and said one coupling member being connected for relative movement axially thereof; means carried by said sleeve and said locking means cooperable for moving said locking means into and from position for engaging said locking element and releasably locking said coupling members in coupled relation responsive to relative axial movement between said sleeve and said one coupling member; means operatively connected with said one coupling member and said sleeve for urging relative axial movement therebetween for moving said locking means into said locking position; latching means surrounding said one coupling member and movable axially thereof to engage and releasably latch said locking means out of said locking position responsive to relative axial movement between said one coupling member and said sleeve for moving said locking means from said locking position; said locking means restraining relative axial movement between said sleeve and said one coupling member when said locking means is latched by said latching means; and means operatively connected with said latching means operable by engagement with said other coupling member to move said latching means for releasing said locking means and said sleeve.

2. A coupling comprising: a pair of mutually engageable coupling members; locking means movable on one of said coupling members; a locking element on the other of said coupling members; a sleeve movable axially on said one coupling member; means operatively associated with said sleeve and said locking means cooperable for moving said locking means into and from a position engaging said locking element responsive to axial movement of said sleeve; means on said one coupling member urging said sleeve to move said locking means into said locking position; latching means including a ring surrounding said one coupling member operable to engage and releasably latch said locking means against movement toward said locking position responsive to movement of said locking means out of said locking position; said locking means restraining axial movement of said sleeve when said locking means is latched by said latching means; and means operatively connected with said latching means operable when engaged by said other coupling member, to move said latching means for releasing said locking means and said sleeve.

3. A coupling comprising: a pair of mutually engageable coupling members; locking members pivoted on one of said coupling members; a locking element on the other of said coupling members; a sleeve on said one coupling member; said sleeve and said one coupling member being connected for relative movement axially thereof; means operatively associated with said sleeve and said locking members cooperable for moving said locking members into and from locking engagement with said locking element; a latching ring surrounding on said one coupling member and movable relative thereto into and from position for engaging and holding said locking members out of said locking position; means operatively connected with said one coupling member and said ring urging said ring into said latching position responsive to said locking members being moved out of said locking position; said locking members when latched by said ring, engaging said sleeve and preventing relative axial movement between said sleeve and said one coupling member; and latch releasing means operatively connected with said latching ring and said one coupling member operable by engagement with said other coupling member for moving said latching ring to release said locking members.

4. A coupling comprising: a pair of mutually engageable coupling members; locking members pivoted on one of said coupling members; a locking element on the other of said coupling members; a sleeve on said one coupling member; said sleeve and said one coupling member being connected for relative axial movement; means operatively associated with said sleeve and said locking members cooperable for moving said locking members into and from locking engagement with said locking element; a latching ring surrounding said one coupling member and movable thereon into and from position for holding said locking members out of said locking position; means operatively connected with said one coupling member and said ring urging said ring into said latching position responsive to said locking members being moved out of said locking position; said locking members when latched by said ring, restraining relative axial movement between said sleeve and said one coupling member; latch releasing means operatively connected with said latching ring and said one coupling member operable by engagement with said other coupling member for moving said latching ring to release said locking members; and means operatively connected with said sleeve and said one coupling member operable to effect relative movement between said sleeve and said one coupling member for moving said locking members into locking engagement with said locking element responsive to said release of said locking members.

5. A coupling comprising: a pair of mutually engageable coupling members; locking members pivoted on one of said coupling members; a locking element on the other of said coupling members; a sleeve on said one coupling member; said sleeve and said one coupling member being connected for relative axial movement; means on said sleeve and said locking members cooperable for moving said locking members into and from locking engagement with said locking element; a latching ring surrounding said one coupling member and movable thereon into and from position for engaging and holding said locking members out of said locking position; means operatively connected with said one coupling member and said ring urging said ring into said latching position responsive to said locking members being moved out of said locking position; said locking members when latched by said ring, engaging said sleeve and preventing relative axial movement between said sleeve and said one coupling member; a latch releasing member having an end engaged with said latching ring and movable axially on said one coupling member to move said ring out of said latching position; the other end of said latch releasing members being engageable with the other of said coupling members for effecting said releasing movement of said releasing member; and means urging relative movement between said sleeve and said one coupling member for moving said locking members into locking engagement with said locking element responsive to said release of said locking members.

6. A coupling comprising: a pair of mutually engageable coupling members; locking dogs pivoted on one of said coupling members; a locking element on the other of said coupling members; an actuating sleeve surrounding said one coupling member and axially movable relative thereto; means on said sleeve and said locking dogs cooperable for moving said dogs into and from a position for engaging said locking element on said other coupling member; means urging said sleeve to move axially in a direction for moving said dogs into said locking position; a latching ring disposed between said sleeve and said one coupling member for movement into and from a position for engaging and holding said dogs out of said locking position; means urging said ring into said latching position operable responsive to movement of said dogs out of said locking position; said dogs when so latched engaging said sleeve and restraining axial movement of said sleeve in a direction for moving said dogs into said locking position; and latch releasing members extending forwardly from said latching ring operable by engagement with said other coupling member to move said ring out of said latching position.

7. A coupling comprising: a pair of mutually engageable coupling members; locking dogs mounted on one of said coupling members for swinging movement; a locking element on the other coupling member; a sleeve slidably on said one coupling member in surrounding relation to said dogs; means on said sleeve and said dogs cooperable to swing said dogs into and from a position engaging said element to releasably lock said coupling members in coupled relation; a latching ring surrounding and axially movable on said one coupling member; spring means on said one coupling member urging said latching ring into position to engage and hold said dogs out of said locking position responsive to movement of said dogs out of said locking position; said dogs when thus latched being disposed to engage said sleeve and restrain axial movement of the said sleeve relative to said one coupling member; a latch releasing member engaged with said ring and axially movable on said one coupling member for moving said ring out of said latching position; said latch releasing member extending from said one coupling member for axial movement by engagement with said other coupling member to move said ring out of said latching position and a spring interposed between said sleeve and said one coupling member operable to move said sleeve in a direction for moving said dogs into said locking position responsive to said movement of said ring out of said latching position.

8. A coupling comprising: a pair of mutually engageable coupling members; locking dogs mounted on one of said coupling members for swinging movement; a locking element on the other coupling member; a sleeve slidable on said one coupling member in surrounding relation to said dogs; means on said sleeve and said dogs cooperable to swing said dogs into and from a position engaging said element to releasably lock said coupling members in coupled relation; a latching ring slidably surrounding on said one coupling member; spring means on said one coupling member urging said latching ring into position to engage and hold said dogs out of said locking position responsive to movement of said dogs out of said locking position; said dogs when thus latched being disposed to engage said sleeve and restrain sliding movement of the sleeve relative to said one coupling member; said dogs being arranged in a circular series on said one coupling member; latch releasing members slidable on said one coupling member between said dogs and operatively engaged with said ring; said latch releasing members having portions for engaging said other coupling member and effecting axial movement of said releasing members to move said ring out of said latching position responsive to the movement of said coupling members into engagement with one another; and a spring interposed between said one coupling member and said sleeve operable to move said sleeve in a direction for moving said dogs into said locking position responsive to movement of said latching ring out of said latching position.

9. A coupling comprising: a pair of mutually engageable coupling members; locking dogs mounted on one of said coupling members for swinging movement; a locking element on the other coupling member; a sleeve slidable on said one coupling member in surrounding relation to said dogs; means on said sleeve and said dogs cooperable to swing said dogs into and from a position engaging said element to releasably lock said coupling members in coupled relation; a latching ring surrounding said one coupling member for sliding movement thereon; means on said ring and said dogs cooperable to latch said dogs out of said locking position; a flange on said sleeve; a coiled spring confined on said one coupling member between said ring and said flange for urging said ring into position to latch said dogs out of said locking position responsive to movement of said dogs out of said locking position; said dogs when thus latched engaging said sleeve to restrain axial movement of the sleeve; latch releasing members operatively connected with said ring movable on said one coupling member by engagement with said other coupling member for moving said ring to release said dogs; and a coiled spring interposed between said one coupling member and said flange operable to move said sleeve in a direction for moving said dogs into said locking position responsive to said release of said dogs.

10. A coupling comprising: a pair of mutually engageable coupling members; locking dogs pivotally mounted on one of said coupling members; a locking element on the other coupling member; a sleeve slidable on said one coupling member in surrounding relation to said dogs; means on said sleeve and said dogs cooperable to move said dogs into and from a position engaging said element to releasably lock said coupling members in coupled relation; a latching ring surrounding said one coupling member for sliding movement thereon; a flange on the interior of said sleeve; a coiled spring on said one coupling member confined between one side of said flange and said latching ring for urging said ring to a position for engaging and latching said dogs out of said locking position responsive to movement of said dogs out of said locking position; a coiled spring of greater strength than that first mentioned spring mounted on said one coupling member with one end abutting the other side of said flange; means on said one coupling member engaging the other end of the last mentioned spring; said last mentioned spring urging said sleeve in a direction for moving said dogs into said locking position; said locking dogs when latched by said ring obstructing sliding movement of said sleeve in said direction; said dogs when latched being in a position for overlying said element on said other coupling member when said coupling members engage one another; and means on said one coupling member operable by engagement with said other coupling member for moving said ring to release said dogs.

11. A coupling comprising: a pair of mutually engageable coupling members; one of said coupling members having a plurality of recesses in the exterior thereof; a plurality of locking dogs pivotally mounted in said recesses; a sleeve slidable on said one coupling member over said dogs; a locking element on the other coupling member; means on said dogs and said sleeve cooperable to move said dogs into and out of locking engagement with said locking element responsive to sliding of said sleeve; a latching ring slidable on said one coupling member; means urging said ring into a latching position for engaging and holding said dogs out of locking position responsive to movement of said dogs out of locking position; latch releasing members connected with said ring and slidable in said recesses beneath said dogs for moving said ring out of said latching position; said latch releasing members having portions engageable by said other coupling member for sliding said latch releasing members to move said ring out of said latching position; and means urging said sleeve in a direction for moving said dogs into said locking engagement with said locking element responsive to movement of said ring out of said latching position.

12. A coupling comprising: a pair of mutually engageable coupling members; one of said coupling members having a plurality of recesses in the exterior thereof; a plurality of locking dogs pivotally mounted in said recesses; a sleeve slidable on said one coupling member over said dogs; a locking element on the other coupling member; means on said dogs and said sleeve cooperable to move said dogs into and out of locking engagement with said locking element responsive to sliding of said sleeve; a latching ring slidably surrounding said one coupling member; means urging said ring into a latching position for engaging and holding said dogs out of locking position responsive to movement of said dogs out of locking position; said one coupling member having other recesses exteriorly thereof between said first named recesses; latch releasing members connected with said ring slidable in said other recesses for moving said ring out of said latching position; said latch releasing members being disposed to be engaged by said other coupling member for sliding said latch releasing members to move said ring out of said latching position; and means on said one coupling member operable to move said sleeve in a direction for moving said dogs into said locking position upon movement of said ring out of said latching position.

13. A coupling comprising: a pair of mutually engageable coupling members; locking dogs pivoted on one of said coupling members; a locking element on the other of said coupling members; an actuating sleeve surrounding said one coupling member and axially movable relative thereto; means on said sleeve and said locking dogs cooperable for moving said dogs into and from a position for engaging said locking element on said other coupling member; means urging said sleeve to move axially in a direction for moving said dogs into said locking position; a latching ring movable axially on said one coupling member into and from a position for engaging and latching said dogs out of said locking position; said latching ring having a portion for embracing ends of said dogs when said dogs are moved into said latching position; means on said one coupling member urging said latching ring into said latching position responsive to movement of said dogs out of said locking position; said dogs when thus latched obstructing axial movement of said sleeve; said portion of said ring having notches therein; said one coupling member having recesses in the exterior surface thereof; latch releasing rods mounted in said recesses for sliding movement; said rods having ends thereof disposed to be engaged by said other coupling member for effecting sliding movement of said rods in said recesses; and lugs on said rods engaged in said notches for moving said ring out of said latching position responsive to said sliding of said rods.

14. A coupling comprising: a pair of mutually engageable coupling members; locking means movable on one of said coupling members; a locking element on the other of said coupling members; a sleeve movable axially on said one coupling member; means on said sleeve and said locking means cooperable for moving said locking means into and from a position engaging said locking element responsive to axial movement of said sleeve; a latching member movable on said one coupling member to engage and releasably latch said locking means against movement toward said locking position responsive to movement of said locking means out of said locking position; a pair of springs on said one coupling member concentric with one another and operable independently for urging said sleeve in the direction for moving said locking means into said locking position and said latching member into said latching position, respectively; and said locking means restraining axial movement of said sleeve when said locking means is latched by said latching member; and means operatively connected with said latching member operable when engaged by said other coupling member, to move said latching member for releasing said locking means and said sleeve.

15. A coupling comprising: a pair of mutually engageable coupling members; locking members pivoted on one of said coupling members; a locking element on the other of said coupling members; an actuating sleeve; said sleeve and said one coupling member being connected for relative movement axially thereof; means on said sleeve and said locking members cooperable for moving said locking members into and from locking engagement with said locking element; spring means between said one coupling member and said sleeve for urging said sleeve in the direction for moving said locking members into said locking engagement with said element; a latching ring movable on said one coupling member into and from position for engaging and holding said locking members out of said locking position; a second spring means operatively connected with said one coupling member and said ring operable to move said ring into said latching position responsive to said locking members being moved out of said locking position; a spacer member on said one coupling member extending between said two spring means; said locking members when latched by said ring, being engaged with said sleeve to prevent relative axial movement between said sleeve and said one coupling member; and latch releasing means operatively connected with said latching ring and said one coupling member operable by engagement with said other coupling member for moving said latching ring to release said locking members.

16. A coupling comprising: a pair of mutually engageable coupling members, one of said coupling members including a tubular body; a group of locking members movable on said body; a locking element on the other of said coupling members; an actuating sleeve axially movable on said body; means on said sleeve and said locking members cooperable to move said locking members into locking engagement with said element responsive to axial movement of said sleeve in one direction, and to move said locking member into an unlocking position responsive to axial movement of said sleeve in the opposite direction; a spacer sleeve between said body and said actuating sleeve; a spring surrounding said spacer sleeve urging said actuating sleeve in said one direction; a latch member movable on said body; a spring between said body and said spacer sleeve operable to urge said latch member into a position engaging and holding locking members of said group in said unlocking position, responsive to said axial movement of said actuating sleeve in said opposite direction; said locking members obstructing movement of said actuating sleeve in said one direction when held by said latch member; and releasing means operatively connected with said latch member operable by contact with said other coupling member for moving said latch member to release said locking members.

17. A coupling comprising: a pair of mutually engageable coupling members; a group of locking dogs pivotally mounted on one of said coupling members; a locking element on the other coupling member; an actuating sleeve slidably on said one coupling member in surrounding relation to said dogs; means on said sleeve and said dogs cooperable to move said dogs into and from a position engaging said element; a latch ring surrounding said one coupling member for sliding movement thereon; a coiled spring on said one coupling member having one end engaged with said ring and operable to move said ring into a position for latching locking dogs of said group out of said locking position responsive to movement of such dogs out of said locking position; a second coiled spring mounted surrounding said one coupling member with one end abutting said actuating sleeve; a spacer member on said one coupling member extending axially of and between said springs; shoulders on said spacer member engaging the other ends of said springs; said second spring urging said sleeve in one direction for moving said dogs into said locking position; said locking dogs obstructing sliding movement of said sleeve in said one direction when latched by said ring; said dogs when latched being in a position to extend over said element on said other coupling member when said coupling members engage one another; and means on said one coupling member operable by engagement with said other coupling member for moving said ring to release said dogs.

References Cited in the file of this patent

UNITED STATES PATENTS

| | | |
|---|---|---|
| 2,425,500 | Wiggins | Aug. 12, 1947 |
| 2,461,699 | Scheiwer | Feb. 15, 1949 |
| 2,473,973 | Scheiwer | June 21, 1949 |
| 2,568,516 | Scheiwer | Sept. 18, 1951 |